Patented Aug. 2, 1932

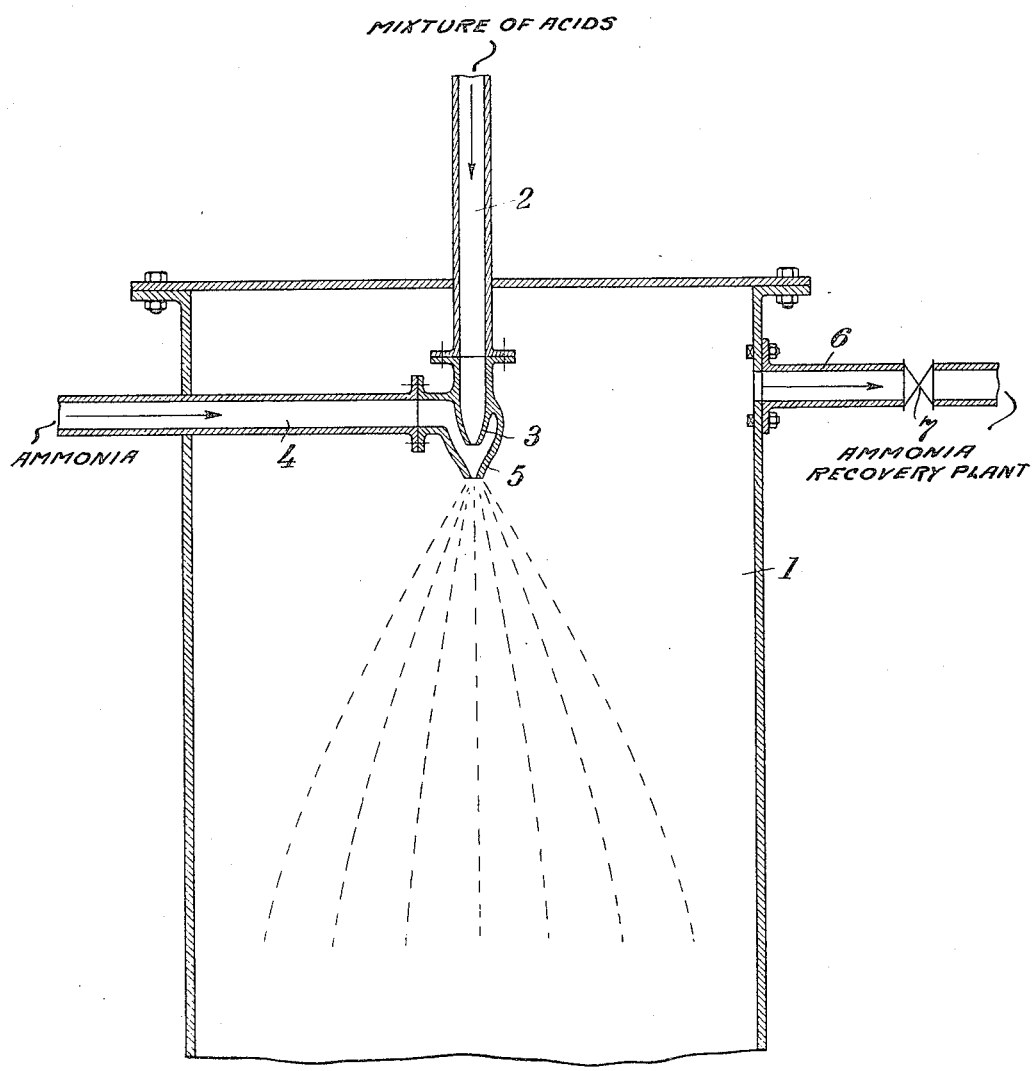

1,869,688

UNITED STATES PATENT OFFICE

HEINRICH HEIMANN, OF DESSAU IN ANHALT, GERMANY, ASSIGNOR TO I. G. FARBEN-INDUSTRIE AKTIENGESELLSCHAFT OF FRANKFORT-ON-THE-MAIN, GERMANY, A CORPORATION OF GERMANY

METHOD FOR MANUFACTURING MIXED FERTILIZERS

Application filed May 10, 1928, Serial No. 276,815, and in Germany June 11, 1927.

The present invention relates to mixed fertilizers and to so-called complete fertilizers which may be made directly in a single operation, that is to say, without previous manufacture of the components, by spraying a mixture of mineral acids such as nitric acid, sulfuric acid and phosphoric acid by means of ammonia gas or gases or vapours containing ammonia gas. For the free acids which may be highly diluted there may be substituted partly their ammonium salts; other fertilizing salts, such as potash salts, may be dissolved or suspended in the acids which are to be sprayed by means of the gas or vapour. In this manner there may be obtained mixed fertilizers, which can be satisfactorily strewn, and even contain two or more components or even constitute complete ferilizers containing the fertilizing constituents in the correct proportion. If the proportion of water in the dilute acids used is so large that the heat of reaction does not suffice to evaporate it completely the product can be dried subsequently.

The apparatus used in my process is only a simple one. In the accompanying drawing a preferred form of the apparatus is shown in a vertical section. Obviously, any other apparatus of this kind may be used. In the drawing 1 is a closed reaction vessel, 2 is an inlet tube for the mixture of acids bearing on its one end a spraying nozzle 3. 4 is an inlet tube for ammonia, provided with a nozzle 5 which surrounds the nozzle 3. 6 is an outlet tube provided with a valve 7 guiding ammonia in excess to a washing tower (not shown).

It has been proposed to make ammonium salts by scattering the corresponding aqueous acid in an ammoniacal atmosphere or by adding ammonia under pressure but the manufacture of mixed fertilizers or complete fertilizers containing several fertilizing salts constitutes a valuable technical advance.

The following examples illustrate the invention without limiting it, the parts being by weight:—

*Example 1.* A warm mixture of 40 parts of ammonium nitrate in the form of a solution of 90 per cent. strength and 44.5 parts of sulfuric acid in the form of a solution of 72 per cent. strength is sprayed into a reaction chamber by means of such a quantity of a mixture of 3 volumes of air and 1 volume of ammonia gas that the ammonia is present in the proportion exceeding by about 10 per cent. that required theoretically. The mixture of salts thus obtained settles in the form of a more or less fine powder and is continuously removed from the chamber by a conveying device. The excess of ammonia is absorbed in a washing tower. The mixed fertilizer made in accordance with this example contains 26.5 per cent. of nitrogen.

*Example 2.* 29 parts of ammonium sulfate are dissolved in a mixture of 26.6 parts of phosphoric acid in the form of a solution of 85 per cent. strength and 27.7 parts of $HNO_3$ in the form of a solution of 65 per cent. strength. The mixture is sprayed by means of a warm mixture of 4 volumes of air and 1 volume of ammonia. There is thus obtained a fertilizer having about 25.5 per cent. of N and 19 per cent. of $P_2O_5$.

It is obvious to all skilled in the art that the invention is not limited to the foregoing examples or to the details given therein. If for instance 76.5 parts of potassium chloride containing potassium equivalent to 57.5 per cent. $K_2O$ are added to the mixture of ammonium sulfate and free acids described in Example 2 there is obtained a complete fertilizer having 15.5 per cent. N, 11.4 per cent. $P_2O_5$ and 23.2 per cent. $K_2O$.

What I claim is:—

1. A process for manufacturing mixed fertilizers which comprises spraying a mixture of mineral acids and fertilizer salt solutions into a reaction chamber simultaneously with gaseous ammonia.

2. A process for manufacturing mixed fertilizers which comprises spraying a mixture of ammonium sulfate dissolved in phosphoric acid, of nitric acid, and of a potassium chloride solution into a reaction chamber simultaneously gaseous ammonia.

In testimony whereof, I affix my signature.

HEINRICH HEIMANN.